United States Patent
Uehara

(10) Patent No.: US 7,792,892 B2
(45) Date of Patent: Sep. 7, 2010

(54) MEMORY CONTROL METHOD FOR STORING OPERATIONAL RESULT DATA WITH THE DATA ORDER CHANGED FOR FURTHER OPERATION

(75) Inventor: Teruaki Uehara, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 1115 days.

(21) Appl. No.: 11/454,863

(22) Filed: Jun. 19, 2006

(65) Prior Publication Data

US 2006/0288068 A1    Dec. 21, 2006

(30) Foreign Application Priority Data

Jun. 20, 2005   (JP)   ............................. 2005-179387

(51) Int. Cl.
*G06F 17/14*   (2006.01)
(52) U.S. Cl. ...................................... 708/404
(58) Field of Classification Search .................. None
See application file for complete search history.

(56) References Cited

U.S. PATENT DOCUMENTS 7,555,512 B2 *   6/2009   Chen et al. .................. 708/409
2003/0050945 A1*   3/2003   Chen et al. .................. 708/404
2006/0095492 A1*   5/2006   Brown et al. ................. 708/404

OTHER PUBLICATIONS

Takuya Ooura, "Rough Note on the Fast Fourier Transform", pp. 1-3, (Online), Research Institute for Mathematical Sciences, Kyoto University, (searched on Jun. 3, 2005), on the internet, http://www.kurims.kyoto-u.ac.jp/-ooura/fftman/fft_note_s.pdf.

* cited by examiner

Primary Examiner—David H Malzahn
(74) Attorney, Agent, or Firm—Studebaker & Brackett PC; Donald R. Studebaker

(57) ABSTRACT

An FFT operational device includes memory banks, an FFT operational circuit, and an FFT memory control circuit. The memory banks can overwrite pieces of data to specified address locations simultaneously or read out the data from the locations simultaneously. The operational circuit receives operands read out from the banks simultaneously to perform an FFT operation processing on the operands to output operation results simultaneously, and repeats the FFT operation processing a predetermined number of times. The memory control circuit receives the operation results output from the operational circuit simultaneously, and changes the order of the data in such a way that the pieces of data required for the operational circuit in the successive operation processing will be provided simultaneously. The resultant data are overwritten to the memory banks. The operational device thereby performs FFT or IFFT processing on hardware, the storage capacity thus being reduced with operational speed increased.

7 Claims, 8 Drawing Sheets

Fig. 2A

Time 0:

| | 31-1 | 31-2 | 31-3 | 31-4 |
|---|---|---|---|---|
| 41-30~41-33 | [192] | 448 | 704 | 960 |
| 41-20~41-23 | [128] | 384 | 640 | 896 |
| 41-10~41-13 | [64] | 320 | 576 | 832 |
| 41-00~41-03 | [0] | 256 | 512 | 768 |

Fig. 2B

Time 1:

| | 31-1 | 31-2 | 31-3 | 31-4 |
|---|---|---|---|---|
| 41-30~41-33 | (1) | (257) | (523) | (769) |
| 41-20~41-23 | [448] | [384] | 640 | 896 |
| 41-10~41-13 | 704 | [320] | 576 | 832 |
| 41-00~41-03 | 960 | [256] | 512 | 768 |

Fig. 2C

Time 2:

| | 31-1 | 31-2 | 31-3 | 31-4 |
|---|---|---|---|---|
| 41-30~41-33 | (65) | (321) | (577) | (833) |
| 41-20~41-23 | 1 | 257 | 523 | 769 |
| 41-10~41-13 | [704] | [640] | [576] | 832 |
| 41-00~41-03 | 960 | 896 | [512] | 768 |

Fig. 2D

Time: 3

| | 31-1 | 31-2 | 31-3 | 31-4 |
|---|---|---|---|---|
| 41-30~41-33 | (129) | (385) | (641) | (897) |
| 41-20~41-23 | 65 | 321 | 577 | 833 |
| 41-10~41-13 | 1 | 257 | 523 | 769 |
| 41-00~41-03 | [960] | [896] | [832] | [768] |

Fig. 2E

AFTER PROCESSED AT Time 3:

| | 31-1 | 31-2 | 31-3 | 31-4 |
|---|---|---|---|---|
| 41-30~41-33 | (193) | (449) | (705) | (961) |
| 41-20~41-23 | 129 | 385 | 641 | 897 |
| 41-10~41-13 | 65 | 321 | 577 | 833 |
| 41-00~41-03 | 1 | 257 | 523 | 769 |

Fig. 4A

Time 0:

|  | 31-1 | 31-2 | 31-3 | 31-4 |
|---|---|---|---|---|
| 41-30~41-33 | [54] | 320 | [576] | 832 |
| 41-20~41-23 | [0] | 256 | [512] | 768 |
| 41-10~41-13 | – | – | – | – |
| 41-00~41-03 | – | – | – | – |

Fig. 4B

Time 1:

|  | 31-1 | 31-2 | 31-3 | 31-4 |
|---|---|---|---|---|
| 41-30~41-33 | (128) | (384) | (640) | (896) |
| 41-20~41-23 | [320] | [256] | [832] | [768] |
| 41-10~41-13 | – | – | – | – |
| 41-00~41-03 | – | – | – | – |

Fig. 4C

AFTER Time 1 PASSED:

|  | 31-1 | 31-2 | 31-3 | 31-4 |
|---|---|---|---|---|
| 41-30~41-33 | 192 | 448 | 704 | 960 |
| 41-20~41-23 | 128 | 384 | 640 | 896 |
| 41-10~41-13 | – | – | – | – |
| 41-00~41-03 | – | – | – | – |

Fig. 8

| OPERATION NO. / STAGE NO. | T10 | T20 | T30 | T40 | T50 |
|---|---|---|---|---|---|
| 1 | 0, 256, 512, 768 | 0, 64, 128, 192 | 0, 16, 32, 48 | 0, 4, 8, 12 | 0, 1, 2, 3 |
| 2 | 1, 257, 513, 769 | 1, 65, 129, 193 | 1, 17, 33, 49 | 1, 5, 9, 13 | 4, 5, 6, 7 |
| 3 | 2, 258, 514, 770 | 2, 66, 130, 194 | 2, 18, 34, 50 | 2, 6, 10, 14 | 8, 9, 10, 11 |
| 4 | 3, 259, 515, 771 | 3, 67, 131, 195 | 3, 19, 45, 51 | 3, 7, 11, 15 | 12, 13, 14, 15 |
| ... | ... | ... | ... | ... | ... |

MEMORY CONTROL METHOD FOR STORING OPERATIONAL RESULT DATA WITH THE DATA ORDER CHANGED FOR FURTHER OPERATION

BACKGROUND OF THE INVENTION

1. Field of the Invention

The present invention relates to a method for controlling a memory and an operational device using the method. More specifically, the present invention relates to a method of using, for example, in an operational device which performs, on hardware or circuitry, processing such as fast Fourier transform (FFT) or inverse fast Fourier transform (IFFT), a sort of the fast Fourier transform, an operational means for performing FFT or IFFT, and a memory control means disposed between the operational means and a plurality of memory banks for storing data used for operation, the memory control means controlling to which memory bank data is written in order to save the storage capacity of the memory required for performing FFT or IFFT processing.

2. Description of the Background Art

Recent communication processing often uses orthogonal frequency division multiplexing (OFDM). More specifically, the OFDM is used for transmission schemes such as a groundwave digital broadcasting, a wireless local area network (LAN) under IEEE (Institute of Electric and Electronics Engineering) 802.11a and 802.11g, etc., and a power line communication MODEM.

The OFDM processing mainly occupies FFT or IFFT processing. It is thus required for the OFDM processing to be implemented with a small fast operating FFT or IFFT circuit. In general, the FFT or IFFT processing is implemented on hardware in order to accomplish fast processing. The FFT is outlined, for example, in an article, Takuya Ooura "Rough Note on the Fast Fourier Transform," pp. 1-3, (Online), Research Institute for Mathematical Sciences, Kyoto University, (searched on Jun. 3, 2005), on the Internet, http://www.kurims.kyoto-u.ac.jp/~ooura/fftman/fft_note_s.pdf.

As described in this document, the discrete Fourier transform (DFT) on one or more (N) points needs $N^2$ computations whereas the FFT needs only computations in proportion to an expression, Nlog N. The FFT has the basic principle based on an idea that a simple conversion of suffixes can resolve the large sized DFT into small sized DFTs which provide easier computations. For example, consider now the computation of the following expression (1) for DFT on N points.

$$A_k = \sum_{j=0}^{N-1} a_j W_N^{jk}, W_N = e^{-2\pi i/N} \quad (1)$$

In this case, each term from $A0$ to $A_{N-1}$ is computed with N multiplications, thereby needing a total of $N^2$ multiplications. If the number N is divisible by two, the suffix k can be classified into even and odd numbers to resolve the DFT on N point into two expressions (2) and (3), each for DFT on N/2 points.

$$A_{2k} = \sum_{j=0}^{N/2-1} (a_j + a_{N/2+j}) W_{N/2}^{jk} \quad (2)$$

$$A_{2k+1} = \sum_{j=0}^{N/2-1} (a_j - a_{N/2+j}) W_N^j W_{N/2}^{jk} \quad (3)$$

The expressions (2) and (3) for the DFT on N/2 points can each be computed with $N^2/4$ multiplications. The resolving can thus reduce the amount of computations to about half. Repeating the resolving twice or three times will reduce the amount of computations to about one-fourth or one-eighth. This is the basic idea of the Cooley Tukey FFT, i. e., radix 2 frequency-decimated Cooley-Tukey FFT.

FIG. 5 shows a data flow of the radix 2 frequency-decimated FFT described in FIG. 1 of the document, Takuya Ooura, stated above. Consider now the computation amount when the resolving into the expressions (2) and (3) is done a number of times equal to $\log_2 N$ to ultimately provide the DFT on one point. This resolving itself requires N/2 times of the complex number multiplication by multiplying $W^j_N$ at each stage and N times of the complex number addition. The number of times of the complex number multiplication is thus reduced to a number equal to $(N/2) \log_2 N$. The amount of the floating point operation is thus in the order of $N\log_2 N$. This is a typical value of the amount of operation with the Cooley Tukey FFT. Several algorithms for reducing the amount of FFT operation are basically to reduce the proportionality constant of this order and a term with a lower order than the value of $N\log_2 N$.

A description will now be given on a general resolving method using the FFT suffix. Assume, for example, that N can be factorized to $N=N_1*N_2$. The suffix j in the expression (1) is replaced by the two suffixes $j_1$ (=0, 1, 2, ..., $N_1-1$) and $j_2$ (=0, 1, 2, ..., $N_2-1$). For certain natural numbers $j_1$ and $j_2$, a mapping for converting the $j_1$ and $j_2$ to j is defined by the following expression (4).

$$j \equiv (J_1 j_1 + J_2 j_2) \mod N \quad (4)$$

First, the mapping of the expression (4) must be of one-to-one correspondence. This requires necessary and sufficient conditions (a) and (b) for certain natural numbers p and q.

(a) When $N_1$ and $N_2$ are relatively prime, at least one of $J_1=pN_2$ and $J_2=qN_1$ is satisfied, and gcd $(J_1, N_1)$=gcd $(J_2, N_2)$=1.

(b) When $N_1$ and $N_2$ are not relatively prime, $J_1=pN_2$, and $J_2 \mod N_1 \neq 0$, and $gcd(p, N_1) = gcd(J_2, N_2)=1$ or $J_1 \mod N_2 \neq 0$, and $J_2=qN_1$, and $gcd(J_1, N_1) = gcd(q, N_2)=1$ Further, the similar mapping is defined for the suffix k by the expression (5).

$$k \equiv (K_1 k_1 + K_2 k_2) \mod N \quad (5)$$

Applying the above conversions to the expression (1) gives the following expression (6).

$$A_{K_1 k_1 + K_2 k_2} = \sum_{j_2=0}^{N_2-1} \sum_{j_1=0}^{N_1-1} a_{J_1 j_1 + J_2 j_2} W_N^{J_1 K_1 j_1 k_1} \quad (6)$$

$$W_N^{J_1 K_2 j_1 k_2} W_N^{J_2 K_1 j_2 k_1} W_N^{J_2 K_2 j_2 k_2}$$

The second and third terms of W in the expression (6) prevent the change of the operation block order in the expression (6), thereby preventing the resolving into the small DFTs. It is seen that if at least one of the conditions $J_1 K_2$ and $J_2 K_1$ as defined by the following expression (7) is satisfied, the expression (6) can be resolved into two small DFTs of $N_1$ and $N_2$.

$$J_1 K_2 \equiv 0 \mod N \text{ or } J_2 K_1 \equiv 0 \mod N \quad (7)$$

Examples satisfying the condition of the expression (7) may be the following two types of the resolvings, (i) and (ii).

(i) When $N_1$ and $N_2$ are relatively prime, $J_1=N_2$, and $J_2=N_1$, and $K_1=N_2$, and $K_2=N_1$.

(ii) When $N_1$ and $N_2$ are arbitrary numbers, $J_1=N_2$, and $J_2=1$, and $K_1=1$, and $K_2=N_1$, or $J_1=1$, and $J_2=N_1$, and $K_1=N_2$, and $K_2=1$.

The first type of resolving is used only when values $N_1$ and $N_2$ are relatively prime. This resolving eliminates the two terms of W in the expression (6) to resolve the expression (6) into bi-dimensional DFT of $N_1$ and $N_2$. This resolving requires selecting the values $N_1$ and $N_2$ which are relatively prime. However, no amount of operation is required for the resolving. Remaining unresolved DFT has its length generally corresponding to a prime number, which needs a certain amount of computation. The FFT with this resolving is used in the prime factor FFT [5, 2, 7] and Winograd DFT algorithm [5, 9].

The second type of resolving can select any values $N_1$ and $N_2$. This type of resolving, however, eliminates only one term of W in the expression (6). The resolving thus requires a multiplication of W (twiddle factor multiplication) for the resolving into DFT of values $N_1$ and $N_2$. The value $N_1$ or $N_2$ can be fixed, however, to a number which the DFT can easily calculate, so that the amount of computation except for the resolving is reduced. The FFT with this resolving is the Cooley-Tukey FFT[3]. Its basic algorithm is that the value $N_1$ is fixed and the resolving is recursively repeated. The value $N_1$ is called "radix". The elimination of two terms of W in the expression (6) is called the decimation-in-frequency algorithm. The elimination of three terms of W is called the decimation-in-time algorithm. The Cooley-Tukey FFT has many types, such as the usual Radix-2 FFT, Arbitrary-Radix FFT, Mixed-Radix FFT, and Split-Radix FET which is supposed to have reduced amount of operation [4, 6, 8]. The foregoing is the outline of the FFT described in the reference document.

Different types of FFT or IFFT processing are used depending on the radix, such as Radix 2 (radix equal to 2), Radix 4 (radix equal to 4), and Radix 8 (radix equal to 8). The Radix 4 is often used because it requires about 75% as much in the amount of operation as the Radix 2 to process the same amount of data.

For the FFT or IFFT processing, when performed in parallel, items of data simultaneously required depend on a processing radix in such a manner as two items of the complex data for Radix 2 and four items of the complex data for Radix 4. To provide the data simultaneously, the memory area need to be divided into a plurality of banks, and the data simultaneously used need to be stored in different memory banks.

FIG. 6 is a schematic block diagram of a conventional Radix FFT operational device. The Radix 4 FFT operational device shown performs the Radix 4 FFT processing in hardware. The operational device includes an Radix 4 FFT operational circuit 1, and a memory 10, such as Random Access Memory (RAM), which provides complex data to the operational circuit 1. The memory 10 is divided into four memory banks 11-1 to 11-4. These memory banks 11-1 to 11-4 have address generators (adr-gen) 12-1 to 12-4 respectively connected thereto. The address generators respectively provide access addresses to the memory banks. The four memory banks 11-1 to 11-4 can provide four pieces of complex data to the FFT operational circuit 1 simultaneously. The four memory banks can also receive four pieces of complex data simultaneously.

FIG. 7 shows the operational flow of a conventional Radix 2 and Radix 4 FFT or IFFT processing. FIG. 7 shows an example for the data number of $4^2$ (=a0 to a15). Note that a solid line shows an addition path, and a dotted line shows a subtraction path in FIG. 7.

Attention is now paid to data used simultaneously in the FFT processing or IFFT processing. IFFT will be done in a similar manner to the FFT processing, so that for simplicity only the FFT processing will be described below. A description will then be given to the FFT processing (1) for Radix 2 and FFT processing (2) for Radix 4.

(1) FFT Processing for Radix 2

One time of the FFT processing shown in the flow in FIG. 7 (Radix 2 FFT basic operation processing) is categorized, from left to right, into a first-stage processing T1, a second-stage processing T2, a third-stage processing T3, and a fourth-stage processing T4. In synchronous with a clock signal not shown, the processing proceeds from the first stage T1 to the fourth stage T4.

The first-stage processing T1 uses the data (a0, a8), (a1, a9), (a2, a10), (a3, a11), (a4, a12), (a5, a13), (a6, a14), and (a7, a15) simultaneously. More specifically, for the first-stage processing T1, the same memory bank (for example, 11-1) needs to store the data a0, a1, a2, a3, a4, a5, a6, and a7, and another memory bank (for example, 11-2) needs to store the data a8, a9, a10, all, a12, a13, a14, and a15.

The second-stage processing T2 uses the data (a0, a4), (a1, a5), (a2, a6), (a3, a7), (a8, a12), (a9, a13), (a10, a14), and (a11, a15) simultaneously. Specifically, for the second-stage processing T2, the same memory bank (for example, 11-3) needs to store the data a0, a1, a2, a3, a8, a9, a10, and all, and another memory bank (for example, 11-4) needs to store the data a4, a5, a6, a7, a12, a13, a14, and a15.

The first-stage processing T1 provides the resulting data a0 and a8 simultaneously. Taking into account of the use in the second-stage processing T2, however, the same memory bank needs to store the data a0 and a8. It was thus necessary to use a plurality of clocks to change the locations in which the data are stored, which prevented the fast processing.

(2) FFT Processing for Radix 4

One time of the FFT processing shown in the FFT flow graph (Radix 4 FFT basic operation processing) is categorized, from left to right, into a first-stage processing T10 and a second-stage processing T20.

The first-stage processing T10 uses the data (a0, a4, a8, a12), (a1, a5, a9, a13), (a2, a6, a10, a14), and (a3, a7, a11, a18) simultaneously. Specifically, for the first-stage processing T10 the memory bank 11-1 needs to store the data a0, a1, a2, a3, the memory bank 11-2 needs to store the data a4, a5, a6, a7, the memory bank 11-3 needs to store the data a8, a9, a10, a11, and the memory bank 11-4 needs to store the data a12, a13, a14, and a15.

The second-stage processing T20 uses the data (a0, a1, a2, a3), (a4, a5, a6, a7), (a8, a9, a10, a11), (a12, a13, a14, a15) simultaneously. Specifically, for the second-stage processing T20 the memory bank 11-1 needs to store the data a0, a4, a8, a12, the memory bank 11-2 needs to store the data a1, a5, a9, a13, the memory bank 11-3 needs to store the data a2, a6, a10, a14, and the memory bank 11-4 needs to store the data a3, a7, a11, and a15.

Whereas the first-stage processing T10 provides the resulting data a0, a4, a8, and a12 simultaneously. Taking into account of the use in the second-stage processing T20, the same memory bank needs to store the data a0, a4, a8, and a12. It was thus necessary to use a plurality of clocks to change the locations in which the data are stored, which prevented the fast processing.

With reference to FIG. 8, the above problems will be described in more detail. FIG. 8 shows an example of a conventional Radix 4 FFT processing (the number of data items $4^5$=1024, data a0 to a1023).

For the Radix 4 FFT on 1024 points that is achieved with four memory banks 11-1 to 11-4, consideration will be given to determining in which of the memory banks 11-1 to 11-4 the data a0 to a1023 are stored.

(1) The Input of the FFT First-Stage Processing T10
memory bank 11-1: 0, 1, 2, 3, 4, 5, . . . , 255
memory bank 11-2: 256, 257, 258, 259, . . . , 511
memory bank 11-3: 512, 513, 514, 515, . . . , 767
memory bank 11-4: 768, 769, 770, 771, . . . , 1023

(2) The Input of the FFT Second-Stage Processing T20
memory bank 11-1: 0, 1, . . . , 63, 256, 257, . . . , 319, 512, 513, . . . , 575, 768, 769, . . . , 831
memory bank 11-2: 64, 65, . . . , 127, 320, 321, . . . , 383, 576, 577, . . . , 639, 832, 833, . . . , 895
memory bank 11-3: 128, 129, . . . , 191, 384, 385, . . . , 447, 640, 641, . . . , 703, 896, 897, . . . , 959
memory bank 11-3: 192, 193, . . . , 255, 448, 449, . . . , 511, 704, 705, . . . , 767, 960, 961, . . . , 1023

(3) The Input of FFT Third-Stage Processing T30
memory bank 11-1: 0, 1, . . . , 15, 64, 65, . . . , 79, 128, 129, . . . , 143, . . . 960, 961, . . . , 975
memory bank 11-2: 16, 17, . . . , 31, 80, 81, . . . , 95, 144, 145, . . . , 159, . . . 976, 977, . . . , 991
memory bank 11-3: 32, 33, . . . , 47, 96, 97, . . . , 111, 160, 161, . . . , 175, . . . 992, 993, . . . , 1007
memory bank 11-3: 48, 49, . . . , 63, 112, 113, . . . , 127, 176, 177, . . . , 191, . . . 1008, 1009, . . . , 1023

(4) The Input of FFT Fourth-Stage Processing T40
memory bank 11-1: 0, 1, 2, 3, 16, 17, 18, 19, 32, 33, 34, . . . , 35, . . . 1008, 1009, 1010, 1011
memory bank 11-2: 4, 5, 6, 7, 20, 21, 22, 23, 36, 37, 38, 39, . . . , 1012, 1013, 1014, 1015
memory bank 11-3: 8, 9, 10, 11, 24, 25, 26, 27, 40, 41, 42, 43, . . . 1016, 1017, 1018, 1019
memory bank 11-3: 12, 13, 14, 15, 28, 29, 30, 31, 44, 45, 46, 47, . . . 1020, 1021, 1022, 1023

(5) The Input of FFT Fifth-Stage Processing T50
memory bank 11-1: 0, 4, 8, 12, . . . 1008, 1012, 1016, 1020
memory bank 11-2: 1, 5, 9, 13, . . . 1009, 1013, 1017, 1021
memory bank 11-3: 2, 6, 10, 14, . . . 1010, 1014, 1018, 1022
memory bank 11-3: 3, 7, 11, 15, . . . 1011, 1015, 1019, 1023.

As seen from the above, just performing the FFT in the order of data a0 to a1023 cannot provide the data in the next-stage FET processing. More specifically, the data a0 to a255 stored in the memory bank 11-1 in the FFT first-stage processing T10 is stored in the four memory banks 11-1 to 11-4 with each having 64 memories in the FFT second-stage processing T20.

SUMMARY OF THE INVENTION

It is an object of the present invention to provide a method for controlling a memory to process FFT efficiently without incurring memory hazard, and a memory control circuit therefor.

It is another object of the present invention to provide a method for controlling a memory to allow one-time computation result data to be stored in specified locations of the memory suitable for successive operation processing, and a memory control circuit therefor.

It is still another object of the invention to provide. a method for controlling a memory with hardware minimized in size, and a memory control circuit therefor.

In accordance with the present invention, a method for reading and writing a memory comprises the steps of: storing first data in a first storage location specified by a row m, where m is any positive integer number, and a column n, where n is any positive integer number; storing second data in a second storage location specified by the row m and a column (n+1); storing third data in a third storage location specified by a row (m+1) and the column n; and storing fourth data in a fourth storage location specified by the row (m+1) and the column (n+1). The method further comprises the steps of: reading out the first and third data; transferring, after reading out the third data, the second data to the third storage location; writing in, after transferring the second data, fifth data to the row m and column n; and writing in, after transferring the second data, sixth data to the row m and column (n+1).

Further according to the present invention, a method for controlling a memory comprises the steps of: using a plurality of memory banks for simultaneously overwriting pieces of data to specified address locations and simultaneously reading out the data from the address locations; and using an operational circuit for receiving a plurality of operands read out simultaneously from the memory banks, and using the operands to perform a operation processing to output a plurality of operation results simultaneously, repeating the operation processing a predetermined number of times. The method further comprises the steps of: using a memory control circuit for controlling writing of data into the memory banks; inputting, by the memory control circuit, the operation results simultaneously output from the operation circuit; and adjusting an order of the data in such a way that the pieces of data required for the operation circuit in a next operation processing will be provided simultaneously to write in the data adjusted to the memory banks.

Still further according to the present invention, a method for controlling a memory, comprises the steps of: using R memory banks for FFT processing or IFFT processing, a number of pieces of data for the FFT or IFFT being equal to $R^n$, where R represents an Radix number and n represents a number of times of the processing, the R memory banks having a size of $R^{n-1}$ for each memory bank, and allowing data to simultaneously be overwritten or read out; and using an operational circuit for receiving R operands read out simultaneously from the R memory banks, and using the R operands to perform the FFT processing or the IFFT processing to output R processing results simultaneously; repeating the FFT processing or IFET processing a predetermined times equal to $R^{n-1} \times n$. The method further comprises the step of reading out, in a k-th stage, where k is a number of stages for processing, of the FFT processing or the IFFT in each of the memory banks, from the R memory banks data with an $R^{(n-k-1)}$ interval, which is one in a last stage of the processing of the FFT processing or the IFFT processing, to thereby control writing of the data into the R memory banks.

An operational device according to the present invention comprises: a plurality of memory banks for simultaneously overwriting pieces of data to specified address locations and simultaneously reading out the data from the address locations; an operational circuit for receiving a plurality of operands read out simultaneously from said plurality of memory banks, and performing an operation processing on the operands to output a plurality of operation results simultaneously, the operation processing being repeated a predetermined number of times; and a memory control circuit for receiving the operation results output simultaneously from said operational circuit, and adjusting an order of the data in such a way that the pieces of data required for said operational circuit in a next operation processing will be provided simultaneously for overwriting the data to said plurality of memory banks.

According to the present invention, memory control means or memory control circuit changes or adjusts the order of the data representing operational results output from the operation means or operational circuit to write the resultant data in specified storage locations in the memory or in a plurality of memory banks.

This can specifically provide the following advantages (1) and (2):

(1) One-time computation result data of the operation means or operational circuit can be stored in specified locations of the memory or memory banks in such a way that the data are divided into blocks suited to the next operation processing. This can provide the efficient FFT processing without stopping it.

(2) In the same specified locations or memory bank addresses as those in which the data used in a certain operation processing are written, the data to be used in the next operation processing can be written. This can thus reduce the memory banks needed for each processing from two sets of memory banks in the conventional technology to one set of memory banks. This can decrease the hardware size.

Further in accordance with the invention, a memory control circuit comprises: a first storing portion selectively receiving outputs from a fifth storing portion and a sixth storing portion; a second storing portion selectively receiving outputs from the sixth storing portion and a twelfth storing portion; a third storing portion selectively receiving outputs from a seventh storing portion and an eighth storing portion; and a fourth storing portion receiving the output from the eighth storing portion. In the control circuit, the fifth storing portion selectively receives outputs from a ninth storing portion and a fifteenth storing portion, the sixth storing portion selectively receives outputs from a tenth storing portion and an eleventh storing portion, the seventh storing portion receives the output from the eleventh storing portion, the eighth storing portion receives the output from the twelfth storing portion, the ninth storing portion selectively receives outputs from a thirteenth storing portion and a fourteenth storing portion, the tenth storing portion receives the output from the fourteenth storing portion, the eleventh storing portion receives the output from the fifteenth storing portion, and said twelfth storing portion receiving an output from a sixteenth storing portion. Preferably, the first through sixteenth storing portions may form a 4-by-4 matrix.

BRIEF DESCRIPTION OF THE DRAWINGS

The objects and features of the present invention will become more apparent from consideration of the following detailed description taken in conjunction with the accompanying drawings in which:

FIGS. 2A-2E show how data are stored in the registers shown in FIG. 1B;

FIGS. 4A, 4B and 4C show, similarly to FIGS. 2A-2E, how data are stored in the registers shown in FIG. 3;

FIG. 8 shows an example of the FFT processing of the conventional Radix 4.

DESCRIPTION OF THE PREFERRED EMBODIMENTS

An operational device in accordance with of a preferred embodiment of the present invention comprises: a plurality of memory banks which can simultaneously overwrite pieces of data to specified address locations or can simultaneously read our the data from the address locations; an operational circuit which receives a plurality of operands read out simultaneously from the memory banks to perform a predetermined operation processing on the operands to output a plurality of operation results simultaneously, and which repeats the operation processing a predetermined number of times to thereby perform fast Fourier transform (FFT) or inverse FFT (IFFT) processing; and a memory control circuit which receives the operation results output simultaneously from the operational circuit, and which overwrites the data to the memory banks with the order of the data changed in such a way that pieces of data required for the operational circuit in a successive operation processing can be provided simultaneously.

Figure 1A:
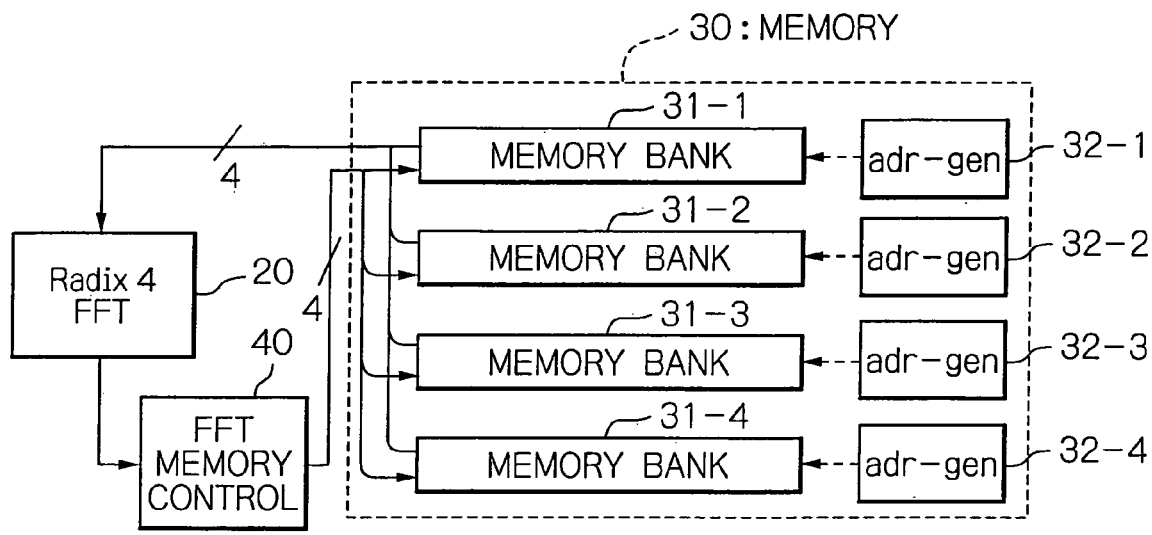
FIG. 1A is a schematic block diagram showing a memory control system for controlling a Radix 4 FFT operational device according to a preferred embodiment of the present invention.
Figure 1B:
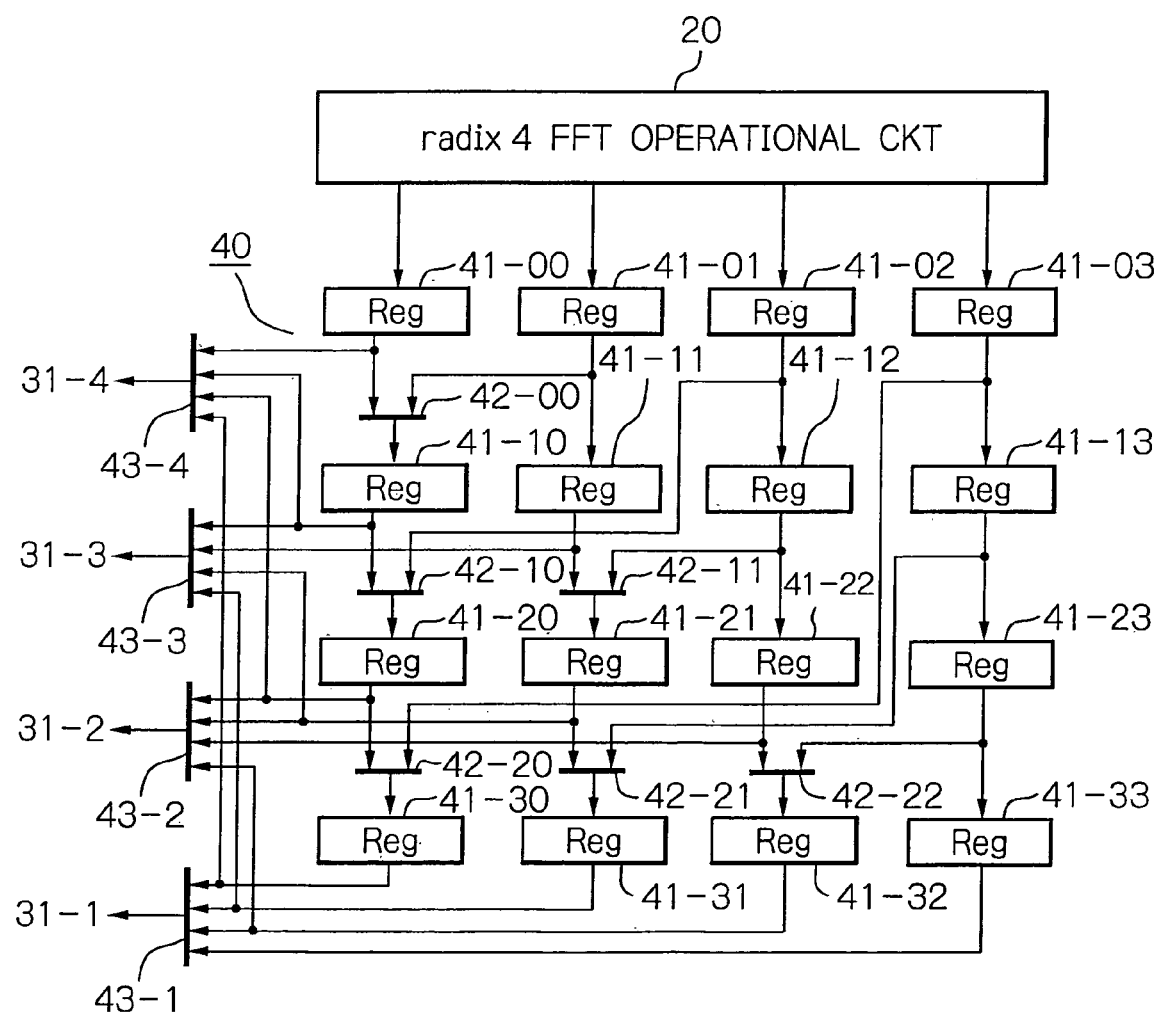
FIG. 1B is also a schematic block diagram of the Radix 4 FFT operational device according to the embodiment shown in FIG. 1A.

FIGS. 1A and 1B are schematic block diagrams showing a Radix 4 FFT operational device according to a preferred embodiment of the present invention. FIG. 1A shows the entire system including the operational device, and FIG. 1B is the block diagram of the FFT memory control circuit.

Figure 6:
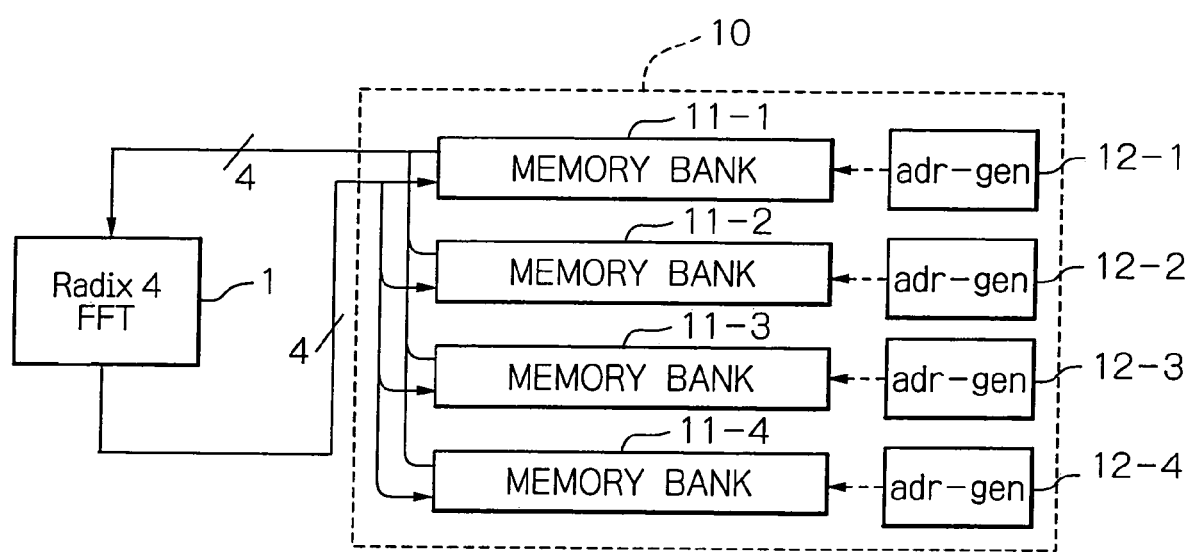
FIG. 6 is a schematic block diagram showing a conventional Radix 4 FFT operational device.
Figure 7:
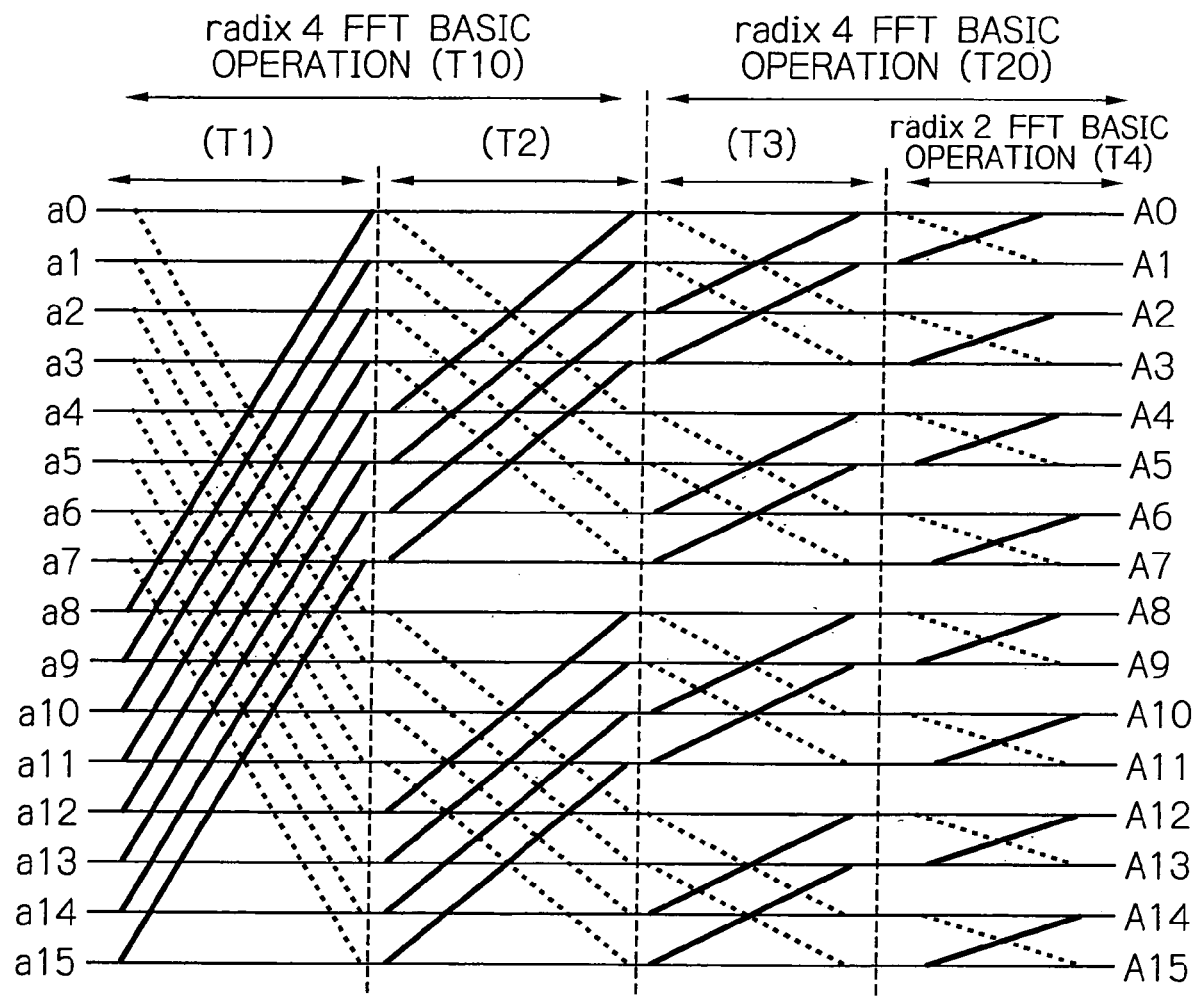
FIG. 7 shows an operation flow of the FFT processing of the conventional Radix 2 and Radix 4.

The Radix 4 FFT operational device shown in FIG. 1A is adapted to perform the Radix 4 FFT processing on hardware. As in the conventional device shown in FIG. 6, the Radix 4 FFT operational device comprises an operation means, for example, Radix 4 FFT operational circuit, 20, and a memory 30 such as random access memory (RAM) which is adapted to provide the complex data to the operational circuit 20. The memory 30 is divided into a plurality of (e.g. four) memory banks 31-1 to 31-4. The memory banks 31-1 to 31-4 have address generators (adr-gen) 32-1 to 32-4 respectively connected thereto. The address generators are adapted to generate the access addresses for the memory banks. The four memory banks 31-1 to 31-4 can provide four pieces of complex data to the FFT operational circuit 20 simultaneously. The four memory banks 31-1 to 31-4 can also receive four pieces of complex data simultaneously.

The Radix 4 FFT processing device in the instant illustrative embodiment specifically includes, between the Radix 4 FFT operational circuit 20 and the memory 30, a memory control means (for example, FFT memory control circuit) 40 for changing or adjusting the order of the data. The FFT memory control circuit 40 is connected to receive four operation results input from the FFT operational circuit 20. The FFT memory control circuit 40 is further adapted to output to the memory 30 the operation results with the data order thus changed taking into account the FFT processing at the next-stage. Specifically, the operation results are stored into the banks in such a way that the data which will be required simultaneously can be provided simultaneously.

For example, the first-stage FFT processing is performed in the order of 0, 64, 128, 192, 1, 65, 129, 193, ... The outputs will then be read as follows:

The first stage 0: 0, 256, 512, 768<--which are stored in the memory bank 31-1 at the second stage.

The first stage 64: 64, 320, 576, 832<--which are stored in the memory bank 31-2 at the second stage.

The first stage 128: 128, 384, 640, 896<--which are stored in the memory bank 31-3 at the second stage.

The first stage 192: 192, 448, 704, 960<--which are stored in the memory bank 31-4 at the second stage. The FFT memory control circuit 40 can write these data into the memory banks 31-1 to 31-4 in such a way that the data can be output simultaneously during the second-stage FFT processing.

The FFT memory control circuit 40 shown in FIG. 1B comprises a plurality of first-stage data holding circuits 41-00 to 41-03, and a plurality of following-stage data holding circuits 41-10 to 41-13, through 41-30 to 41-33, which form a plurality of (e.g. four) register stages formed by 4×4 registers (Reg) with the illustrative embodiment. The data holding circuits or registers 41-00 to 41-03 through 41-30 to 41-33 form a 4-by-4 matrix with the illustrative embodiment. The first-stage data holding circuits and the following-stage data holding circuits are thus adapted for holding the data or the like output from the FFT operational circuit 20.

The control circuit 40 further comprises a plurality of inter-stage selectors respectively provided between those registers at the respective stages (for example, six two-input, one-output selectors) 42-00 to 41-33, as depicted in the figure. The control circuit 40 further includes a plurality of output-stage selectors provided at the output-stages (for example, four four-input, one-output selectors) 43-1 to 43-4 for outputting the data to the memory banks 31-1 to 31-4. Those components are interconnected as illustrated.

The selectors 42-00 to 41-33, and 43-1 to 43-4 are adapted to switch the input and output thereof in response to control signals or the like not shown. Each of the selectors 42-00 to 41-33 between the registers is connected in such a fashion as follows. The first-stage selector 42-00 selects either one of the outputs from the first-stage registers 41-00, 41-01, and provides it to the second-stage register 41-10. The second-stage selector 42-10 selects either one of the output from the second-stage register 41-10 and the output from the first-stage register 41-02, and provides it to the third-stage register 41-20. The second-stage selector 42-11 selects either one of the outputs from the second-stage register 41-11, 41-12, and provides it to the third-stage register 41-21. The third-stage selector 42-20 selects either one of the output from the third-stage register 41-20 and the output from the first-stage register 41-03, and provides it to the fourth-stage register 41-30. The third-stage selector 42-21 selects either one of the output from the third-stage register 41-21 and the output from the second-stage register 41-13, and provides it to the fourth-stage register 41-31. The third-stage selector 42-22 selects either one of the outputs from the third-stage register 41-22, 41-23, and provides it to the fourth-stage register 41-32.

Each of the selectors 43-1 to 43-4 at the output stage is connected in such a manner as read below. The selector 43-1 selects either one of the outputs from the fourth-stage registers 41-30 to 41-33, and provides it to the memory bank 31-1. The selector 43-2 selects either one of the outputs from the fourth-stage register 41-32 and third-stage registers 41-20 to 41-22, and provides it to the memory bank 31-2. The selector 43-3 selects either one of the outputs from the fourth-stage register 41-30, third-stage register 41-21, and second-stage registers 41-10, 41-11, and provides it to the memory bank 31-3. The selector 43-4 selects either one of the outputs from the fourth-stage registers 41-30, third-stage registers 41-20, second-stage registers 41-10, and first-stage register 41-00, and provides it to the memory bank 31-4.

FIGS. 2A-2E show the states of the data stored at Time 0 to Time 3 of the registers 41-00 to 41-33 shown in FIG. 1B. Specifically, FIG. 2A shows, at Time 0, for example, the time when the fourth processing result at the first-stage Radix 4 FFT on the 1024 points enters the FFT memory control circuit 40. This shows that the processing result of the first-stage FFT of the point 192 enters the register 41-00, and the processing result of the first-stage FFT of the point 129 enters the register 41-10. Numerals in brackets [ ] are directed to output data to the memory 30. Numerals in parentheses ( ) are directed to input data from the FFT operational circuit 20. The same applies to the remaining figures, FIGS. 2B-2E, for Time 1 to Time 3.

In synchronous with a clock signal, not shown, the FFT memory control circuit 40 repeats the processings (1) to (5) at Time 0 to Time 3, as will be described in the following.

(1) The Processing at Time 0

At Time 0, the following processings are done simultaneously. The processing result of the point 0 stored in the register 41-30 is output from the selector 43-1 to the memory bank 31-1, and the processing result of the point 960 stored in the register 41-03 is input via the selector 42-20 to the register 41-30. The processing result of the point 64 stored in the register 41-20 is output from the selector 43-2 to the memory bank 31-2, and the processing result of the point 704 stored in the register 41-02 is input via the selector 42-10 to the register 41-20. The processing result of the point 128 stored in the register 41-10 is output from the selector 43-3 to the memory bank 31-3, and the processing result of the point 448 stored in the register 41-01 is input via the selector 42-00 to the register 42-10. The processing result of the point 192 stored in the register 41-00 is output from the selector 43-4 to the memory bank 31-4, and from the FFT operational circuit 20, the processing result of the point 1 is input to the register 41-00. From the FFT operational circuit 20, the processing result of the point 257 is input to the register 41-01. From the FFT operational circuit 20, the processing result of the point 523 is input to the register 41-02. From the FFT operational circuit 20, the processing result of the point 769 is input to the register 41-03.

(2) The Processing at Time 1

At Time 1, the following processings are done simultaneously. The processing result of the point 256 stored in the register 41-31 is output from the selector 43-1 to the memory bank 31-1, and the processing result of the point 896 stored in the register 41-13 is input via the selector 42-21 to the register 41-31. The processing result of the point 320 stored in the register 41-21 is output from the selector 43-2 to the memory bank 31-2, and the processing result of the point 640 stored in the register 41-12 is input via the selector 42-11 to the register 41-21. The processing result of the point 384 stored in the register 41-11 is output from the selector 43-3 to the memory bank 31-3, and the processing result of the point 257 stored in the register 41-01 is input to the register 41-11. The processing result of the point 448 stored in the register 41-10 is output from the selector 43-4 to the memory bank 31-4, and the processing result of the point 1 stored in the register 41-00 is input via the selector 42-00 to the register 41-10. The processing result of the point 523 stored in the register 41-02 is input to the register 41-12. The processing result of the point 769 stored in the register 41-03 is input to the register 41-13. From the FFT operational circuit 20, the processing result of the point 65 is input to the register 41-00. From the FFT operational circuit 20, the processing result of the point 321 is input to the register 41-01. From the FFT operational circuit 20, the processing result of the point 577 is input to the register 41-02. From the FFT operational circuit 20, the processing result of the point 833 is input to the register 41-03.

(3) The Processing at Time 2

At Time 2, the following processings are done simultaneously. The processing result of the point 512 stored in the register 41-32 is output from the selector 43-1 to the memory bank 31-1, and the processing result of the point 832 stored in the register 41-23 is input via the selector 42-22 to the register 41-32. The processing result of the point 576 stored in the register 41-22 is output from the selector 43-2 to the memory bank 31-2, and the processing result of the point 523 stored in the register 41-12 is input to the register 41-22. The processing result of the point 640 stored in the register 41-21 is output from the selector 43-3 to the memory bank 31-3, and the register 41-11 (processing result of the point 257) is input via the selector 42-11 to the register 41-21. The processing result of the point 704 stored in the register 41-20 is output via the selector 43-4 to the memory bank 31-4 output, and the processing result of the point 1 stored in the register 41-10 is input via the selector 42-10 to the register 41-20. The value of the register 41-13 is input to the register 41-23. The value of the register 41-00 is input via the selector 42-00 to the register 41-10. The value of the register 41-01 is input to the register 41-11. The value of the register 41-02 is input to the register 41-12. The value of the register 41-03 is input to the register 41-13. From the FFT operational circuit 20, the processing result of the point 129 is input to the register 41-01. From the FFT operational circuit 20, the processing result of the point 385 is input to the register 41-01. From the FFT operational circuit 20, the processing result of the point 641 is input to the register 41-02. From the FFT operational circuit 20, the processing result of the point 897 is input to the register 41-03.

(4) The Processing at Time 3

At Time 3, the following processings are done simultaneously. The processing result of the point 768 stored in the register 41-33 is output from the selector 43-1 to the memory bank 31-1, and the processing result of the point 769 stored in the register 41-23 is input to the register 41-33. The processing result of the point 832 stored in the register 41-32 is output from the selector 43-2 to the memory bank 31-2, and the processing result of the point 523 stored in the register 41-22 is input via the selector 42-22 to the register 41-32. The processing result of the point 896 stored in the register 41-31 is output from the selector 43-3 to the memory bank 31-3, and the processing result of the point 257 stored in the register 41-21 is input via the selector 42-21 to the register 41-31. The processing result of the point 960 stored in the register 41-30 is output from the selector 43-4 to the memory bank 31-4, and the processing result of the point 1 stored in the register 41-20 is input via the selector 42-20 to the register 41-30. The value of the register 41-10 is input via the selector 42-10 to the register 41-20. The value of the register 41-11 is input via the selector 42-11 to the register 41-21. The value of the register 41-12 is input to the register 41-22. The value of the register 41-13 is input to the register 41-23. The value of the register 41-00 is input via the selector 42-00 to the register 41-10. The value of the register 41-01 is input to the register 41-11. The value of the register 41-02 is input to the register 41-12. The value of the register 41-03 is input to the register 41-13. From the FFT operational circuit 20, the processing result of the point 193 is input to the register 41-00. From the FFT operational circuit 20, the processing result of the point 449 is input to the register 41-01. From the FFT operational circuit 20, the processing result of the point 705 is input to the register 41-02. From the FFT operational circuit 20, the processing result of the point 961 is input to the register 41-03.

(5) After the Processing at Time 3 Completed After the processing at Time 3 is completed, the FFT memory control circuit 40 has the same state as in Time 0. More specifically, the operation at Time 0 will be repeated.

The method for controlling the memory using the operational device shown in FIGS. 1A and 1B will now be expressed as mathematically. In order to effective using the operational device shown in FIGS. 1A and 1B, it is important how to access the memory. For Radix 4, for example, the contents of the four memory banks 31-1 to 31-4 into which the memory 30 is divided will be read out in such a manner as follows: the data at the 0th address (memory banks 31-1 to 31-4 together), the data at the 64th address (memory banks 31-1 to 31-4), and the data at the 128th address (memory banks 31-1 to 31-4).

Specifically, the memory addressing is also a necessary factor. For the addressing, when the data number as the point number is expressed as $R^n$, where R is the Radix number, and n is the number of times of the processing, the relationship $R^n=4$ is established for Radix 4. The number of times of the processing n is, for Radix 4 FFT of 1024 data, for example, n=5 because $4^5=1024$.

Because the number of times of the processings is n, the stage number k of the FFT processing will be given in the manner read as follows:

At the first time, the data is read at each $R^{(n-2)}$-->43=64 for Radix 4.

At the second time, the data is read at each $R^{(n-3)}$-->42=16 for Radix 4.

At the third time, the data is read at each $R^{(n-4)}$-->41=4 for Radix 4.

At the fourth time, the data is read at each $R^{(n-5)}$-->40=1 for Radix 4.

At the fifth time, the data is read at each $R^{(n-5)}$-->40=1 for Radix 4.

Note, however, that only the final processing stage number (k=5) receives the special treatment. This allows for the effective use of the operational device in FIGS. 1A and 1B. The same applies to R=2, 8 (Radix 2, Radix 8). The above will be expressed mathematically to read as follows.

The method for controlling the memory using the operational device in FIGS. 1A and 1B is specifically featured in that in the k-th-stage FFT or IFFT processing in the memory banks (31-1 to 31-4) obtained by dividing the memory (30) into R (Radix number) segments data are read at an interval equal to $R^{(n-k-1)}$. Note that the final stage FFT processing has an interval equal to "1" (one).

The illustrative embodiment provides between the FFT operational circuit 20 and memory 30 the FFT memory control circuit 40 as described above. The FFT memory control circuit 40 can thus store into the separate memory banks 3-1 to 31-4 data to be rendered simultaneously the FFT processing at the next stage, and performs the FFT processing by overwriting in the used memory address locations. This then provides the following advantages (a) (b) and (c).

(a) The operational resultant data from the first stage FFT can be stored in the memory 30 in such a way that the data are divided into blocks suited to the next-stage operation processing. This can provide the efficient FFT processing without stopping it.

(b) In the same address locations as those in which the data used in a certain stage FFT processing are written, the data to be used in the next stage FFT processing can be written. This can thus reduce the memory space from two sets of memories 10, 10 needed in the conventional system shown in FIG. 6 to one set of memories (30), thereby helping to decrease the hardware size.

(c) The FFT memory control circuit 40 according to the illustrative embodiment can use the fewest registers 41-00 to 41-33 required to rearrange the order of the data, thereby providing the least hardware cost. In addition, the selectors 42-00 to 42-22 provided between the registers only include the two-input, four-output type of selectors, which can be implemented by smaller circuitry.

Now, reference will be made to FIG. 3, a schematic block diagram of a Radix 2 and Radix 4 FFT operational circuit for use in both Radix 2 and Radix 4 together with an FFT memory control circuit according to an alternative embodiment of the present invention. Elements like those in the illustrative embodiment shown in and described with reference to FIGS. 1A and 1B are designated with the same reference numerals.

In the alternative embodiment, the FFT operational device for use in both Radix 2 and Radix 4 includes a memory control means (for example, FFT memory control circuit) 40A diposed between the operation means (for example, Radix 2 and Radix 4 FFT operational circuit) 20A and the memory 30. Radix 2 and Radix 4 FFT operational circuit 20A has the first FFT processing (for example, Radix 2 FFT operation) function and the second FFT processing (for example, Radix 4 FFT operation) function, which are switchable between each other. The FFT memory control circuit 40A may be the same as the FFT memory control circuit 40 shown in FIGS. 1A and 1B except that two-input, single-output selectors (Reg) 42-02, 42-12, and 42-13 are added between the registers, and the four-input, single-output selectors 43-2 and 43-1 at the output stage in FIGS. 1A and 1B are replaced by five-input, single-output selectors 43-2A and 43-1A.

Control signals, not shown, can switch the inputs/outputs of the added selectors 42-02, 42-12, and 42-13 between the registers. Each of the selectors 42-02, 42-12, and 42-13 is connected in the manner as follows. The selector 42-02 selects either one of the outputs from the first-stage register 41-02 and 41-03, and provides it to the second-stage register 41-12. The selector 42-12 selects either one of the outputs from the first-stage register 41-02 and second-stage register 41-12, and provides it to the output-stage register 43-2A. The selector 42-13 selects either one of the outputs from the second-stage registers 41-12 and 41-13, and provides it to the output-stage register 43-1A.

The FFT processing device for both of Radix 2 and Radix 4 according to the alternative embodiment is adapted for dealing with both of the Radix 4 FFT and Radix 2 FFT. This is specifically effective when the point number of the FFT is arbitrarily set. The reason for this will be described below.

The Radix 4 FFT can perform, in comparison to the Radix 2 FFT, the number of operations about 25% fewer on the same number of points with the FFT. With the Radix 4 FFT, however, the point number of the FFT has to be expressed in terms of the powers of four. The FFT of the point number which cannot be expressed in terms of the powers of four is thus performed with the mixture of Radix 4 FFT with Radix 2 FFT. The present circuitry satisfies that requirement.

In accordance with the alternative embodiment, the FFT memory control circuit 40A may perform the Radix 4 FFT processing in the same way as the FFT memory control circuit 40 described with reference to FIGS. 1A and 1B. For example, the FFT memory control circuit 40A performs the 1024-point Radix 2 FFT processing without using the registers 41-20, 41-21, 41-22, 41-23, 41-30, 41-31, 41-32, or 41-33.

Figure 3:
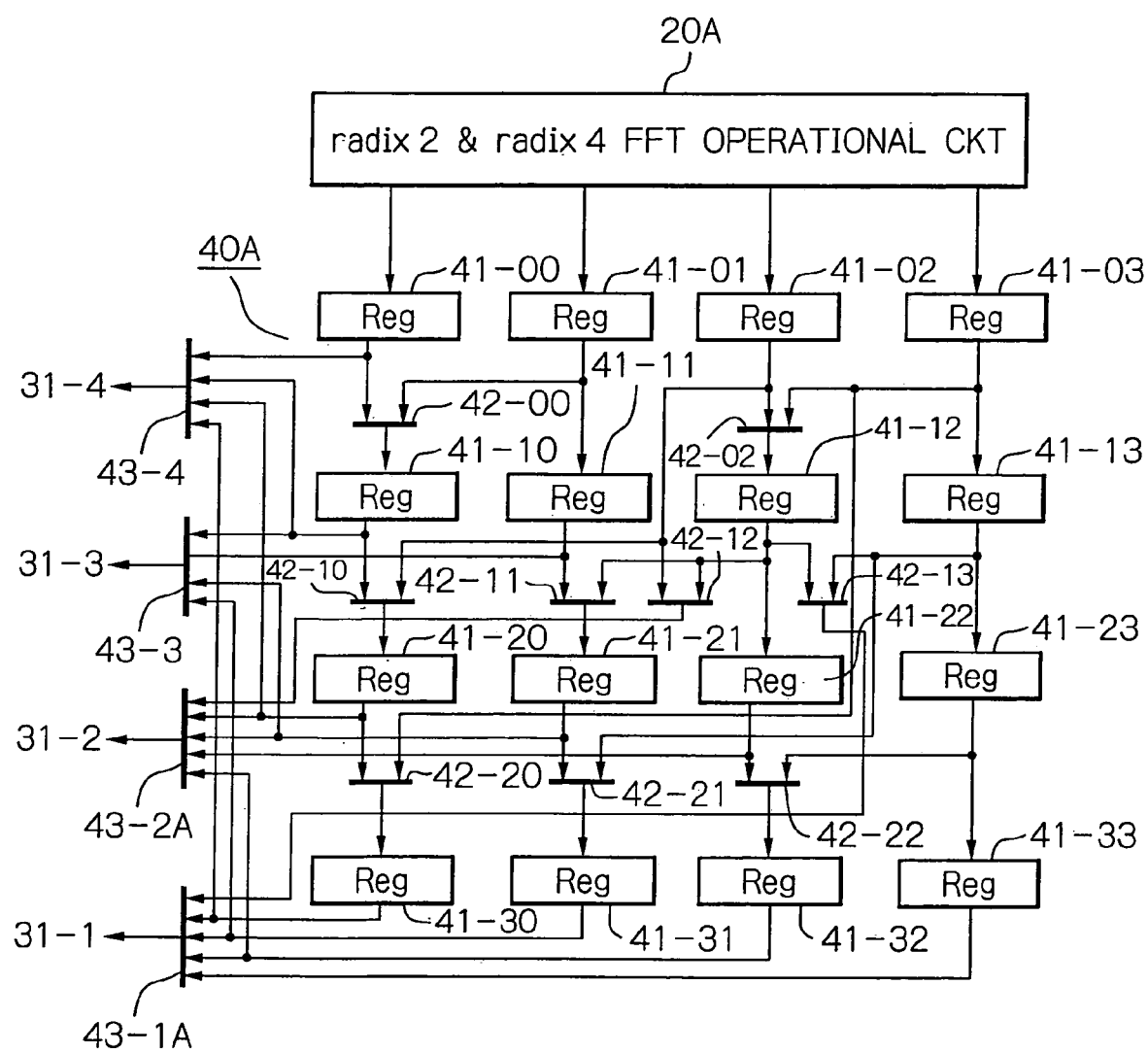
FIG. 3 is a schematic block diagram showing the Radix 2 and Radix 4 FFT operational circuit for use in both Radix 2 and Radix 4 together with an FFT memory control circuit according to an alternative embodiment of the present invention.
Figure 5:
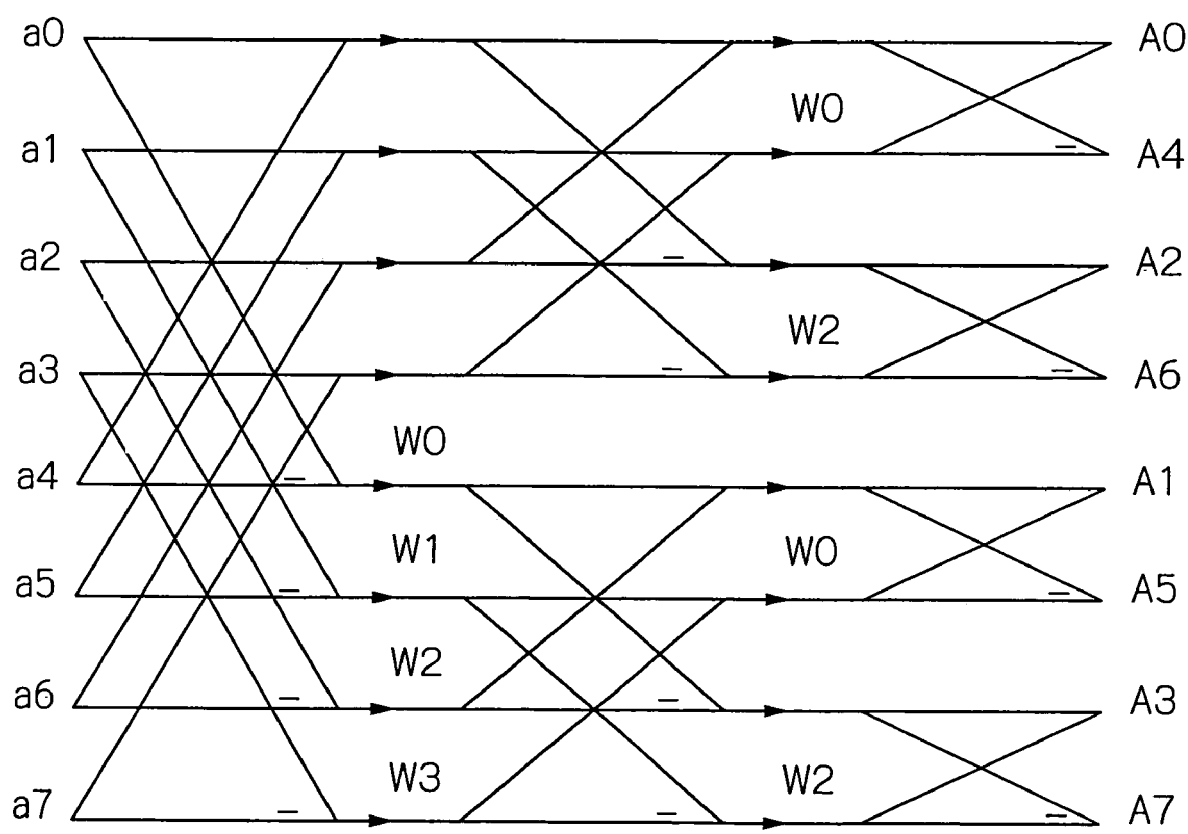
FIG. 5 shows a data flow of the radix 2 decimation in frequency FFT described in the article, Takuya Ooura stated above.

FIGS. 4A, 4B and 4C show the states of data stored at Time 0 to Time 1 of the registers 41-00 to 41-33 included in the circuitry shown in FIG. 3. FIGS. 4A, 4B and 4C represent the meaning similar to FIGS. 2A-2E. For example, for the 1024-point Radix 2 FFT processing, the FFT memory control circuit 40A repeats, in synchronous with the clock signal not shown, the processings (1) (2) and (3) at Time 0 to Time 1 as will be described in the following.

(1) The Processing at Time 0

At Time 0, the following processings are done simultaneously. The processing result of the point 64 stored in the register 41-00 is output from the selector 43-4 to the memory bank 31-4, and from the FFT operational circuit 20A, the processing result of the point 128 is input to the register 41-00. The processing result of the point 0 stored in the register 41-10 is output from the selector 43-3 to the memory bank 31-3, and the processing result of the point 320 stored in the register 41-01 is input via the selector 42-00 to the register 41-10. The processing result of the point 576 stored in the register 41-02 is output from the selector 42-12, 43-2A to the memory bank 31-2, and from the FFT operational circuit 20A, the processing result of the point 640 is input to the register 41-02. The processing result of the point 512 stored in the register 41-12 is output from the selector 42-13, 43-1A to the memory bank 31-1, and the processing result of the point 320 stored in the register 41-03 is input via the selector 42-02 to the register 41-12. From the FFT operational circuit 20A, the processing result of the point 384 is input to the register 41-01. From the FFT operational circuit 20A, the processing result of the point 896 is input to the register 41-03.

(2) The Processing at Time 1

At Time 1, following processings are done simultaneously. The processing result of the point 320 stored in the register 41-10 is output from the selector 43-4 to the memory bank 31-4, and the processing result of the point 128 stored in the register 41-00 is input via the selector 42-00 to the register 41-10. The processing result of the point 256 stored in the register 41-11 is output from the selector 43-3 to the memory bank 31-3, and the processing result of the point 384 stored in the register 41-01 is input to the register 41-01. The processing result of the point 832 stored in the register 41-12 is output from the selectors 42-12 and 43-2A to the memory bank 31-2, and the processing result of the point 640 stored in the register 41-02 is input via the selector 42-02 to the register 41-12. The processing result of the point 768 stored in the register 41-13 is output from the selectors 42-13 and 43-1A to the memory bank 31-1, and the processing result of the point 896 stored in the register 41-03 is input to the register 41-03. From the FFT operational circuit 20A, the processing result of the point 192 is input to the register 41-00. From the FFT operational circuit 20A, the processing result of the point 448 is input to the register 41-01. From the FFT operational circuit 20A, the processing result of the point 704 is input to the register 41-02. From the FFT operational circuit 20A, the processing result of the point 960 is input to the register 41-03.

(3) After the Processing at Time 1 Completed

After the processing at Time 1 is ended, the FFT memory control circuit 40A has the same state as in Time 0. More specifically, the operation at Time 0 will then be repeated.

The FFT memory control circuit 40A in the alternative embodiment can store in the separate memory banks 31-1 to 31-4 the data required simultaneously in the next-stage FFT processing, and can overwrite in the used memory address locations to thereby perform the FFT processing, thus dealing with both of the Radix 2 FFT and Radix 4 FFT. The alternative embodiment thus provides nearly the same advantages as in the illustrative embodiment shown in and described with reference to FIG. 1B, thus being effective specifically when the point number of the FFT is arbitrarily set.

The present invention is not limited to the above-described illustrative embodiments, but various changes can be made thereto. For example, further modifications will be described in the following.

Although the illustrative embodiments described above are mere examples which use the four memory banks 31-1 to 31-4 into which the memory 30 is divided, the four memory banks maybe replaced by four specified storage locations or areas in the memory 30. For example, data may be read out and written in by using the storage locations or areas in the memory 30 in the following manner: a specified location (corresponding to the memory bank 31-1) at a row m, where m is any positive integer number, and a column n, where n is also any positive integer number, a specified location (corresponding to the memory bank 31-2) at the row m and a column (n+1), a specified location (corresponding to the memory bank 31-3) at a row (m+1) and the column n, and a specified location (corresponding to the memory bank 31-4) at a row (m+1) and the column (n+1), to thereby accomplish nearly the same operational advantages as in the illustrative embodiments described above.

Although the illustrative embodiments described above are directed to the FFT processing, application to the IFFT processing can attain nearly the same operational advantages.

The FFT operational circuits 20 and 20A shown in FIGS. 1B and 3, respectively, may be replaced with other configurations than of the Radix 2 FFT and Radix 4 FFT. The number of the memory banks 31-1 to 31-4 or the number of the specified storage locations or areas in the memory 30 may be changed to other numbers than four. The FFT memory control circuits 40 and 40A shown in FIGS. 1B and 3, respectively, may include the number of components, stages or the like different from those described above.

The entire disclosure of Japanese patent application No. 2005-179387 filed on Jun. 20, 2005, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A method for reading and writing a memory, comprising the steps of:
   storing first data in a first storage location specified by a row m, where m is any positive integer number, and a column n, where n is any positive integer number;
   storing second data in a second storage location specified by the row m and a column (n+1);
   storing third data in a third storage location specified by a row (m+1) and the column n;
   storing fourth data in a fourth storage location specified by the row (m+1) and the column (n+1);
   reading out the first and third data;
   transferring, after reading out the third data, the second data to the third storage location;
   writing in, after transferring the second data, fifth data to the row m and the column n; and
   writing in, after transferring the second data, sixth data to the row m and column (n+1).

2. A memory control circuit comprising:
   a first register selectively receiving outputs from a fifth register and a sixteenth register;
   a second register selectively receiving outputs from a sixth register and a twelfth register;
   a third register selectively receiving outputs from a seventh register and an eighth register; and
   a fourth register receiving the output from said eighth register;
   said fifth register selectively receiving outputs from a ninth register and a fifteenth register;
   said sixth register selectively receiving outputs from a tenth register and an eleventh register;
   said seventh register receiving the output from said eleventh register;
   said eighth register receiving the output from said twelfth register;
   said ninth register selectively receiving outputs from a thirteenth register and a fourteenth register;
   said tenth register receiving the output from said fourteenth register;
   said eleventh register receiving the output from said fifteenth register;
   said twelfth register receiving an output from a sixteenth register.

3. The memory control circuit according to claim 2, wherein said first registers through said sixteenth registers form a 4-by-4 matrix.

4. The memory control circuit according to claim 3, wherein
   said first, second, third and fourth registers form a first row of said matrix;
   said fifth, sixth, seventh and eighth registers form a second row of said matrix;
   said ninth, tenth, eleventh and twelfth registers form a third row of said matrix; and
   said thirteenth, fourteenth, fifteenth and sixteenth registers form a fourth row of said matrix.

5. The memory control circuit according to claim 4, wherein
   said first, fifth, ninth and thirteenth registers form a first column of said matrix;
   said second, sixth, tenth and fourteenth registers form a second column of said matrix;
   said third, seventh, eleventh and fifteenth registers form a third column of said matrix; and
   said fourth, eighth, twelfth and sixteenth registers form a fourth column of said matrix.

6. The memory control circuit according to claim 2, further comprising:
   a first selector selectively giving one of the outputs of said fifth and sixteenth registers to said first register;
   a second selector selectively giving one of the outputs of said sixth and twelfth registers to said second register;
   a third selector selectively giving one of the outputs of said seventh and eighth registers to said third register;
   a fourth selector selectively giving one of the outputs of said ninth and fifteenth registers to said first register;
   a fifth selector selectively giving one of the outputs of said tenth and eleventh registers to said sixth register; and
   a sixth selector selectively giving one of the outputs of said thirteenth and fourteenth registers to said ninth register.

7. The memory control circuit according to claim 2, further comprising:
   a first selector selectively outputting one of the outputs of said first, second, third and fourth registers;
   a second selector selectively outputting one of the outputs of said third, fifth, sixth, and seventh registers;
   a third selector selectively outputting one of the outputs of said second, sixth, ninth and tenth registers; and
   a fourth selector selectively outputting one of the outputs of said first, fifth, ninth and thirteenth registers.

* * * * *